United States Patent
Arnold et al.

(10) Patent No.: US 11,593,805 B2
(45) Date of Patent: Feb. 28, 2023

(54) SYSTEM FOR AUTHENTICATING AN ELECTRONIC DEVICE BY MEANS OF AN AUTHENTICATION SERVER

(71) Applicant: GEMALTO SA, Meudon (FR)

(72) Inventors: Frank Arnold, Meudon (FR); Jean Lambert, Meudon (FR); Laurent Castillo, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 94 days.

(21) Appl. No.: 15/568,108

(22) PCT Filed: Sep. 25, 2015

(86) PCT No.: PCT/EP2015/072091
§ 371 (c)(1),
(2) Date: Oct. 20, 2017

(87) PCT Pub. No.: WO2016/169628
PCT Pub. Date: Oct. 27, 2016

(65) Prior Publication Data
US 2018/0137511 A1    May 17, 2018

(30) Foreign Application Priority Data
Apr. 20, 2015 (EP) .................. 15305588

(51) Int. Cl.
*G06Q 20/40* (2012.01)
*G06Q 20/34* (2012.01)
(Continued)

(52) U.S. Cl.
CPC ..... *G06Q 20/4014* (2013.01); *G06Q 20/3226* (2013.01); *G06Q 20/3227* (2013.01);
(Continued)

(58) Field of Classification Search
CPC .............. G06Q 20/4014; G06Q 20/40; G06Q 20/3226; G06Q 20/353; G06Q 20/352;
(Continued)

(56) References Cited

U.S. PATENT DOCUMENTS 8,799,089 B1     8/2014  Gonzalez
8,977,854 B2 *   3/2015  Lee .............. H04L 9/3234
                                                       713/170
(Continued)

FOREIGN PATENT DOCUMENTS

CN        104182870 A  * 12/2014 ........... G06Q 20/105

OTHER PUBLICATIONS

"France Telecom Intros Mobile Phone Commerce", Washingtonpost Newsweek Interactive, Jun. 21, 2000 (Year: 2000).*
PCT/EP2015/072091, International Search Report, dated Dec. 16, 2915, European Patent Office, P.B. 5818 Patentlaan 2 NL—2280 HV Rijswijk.
(Continued)

*Primary Examiner* — Jay Huang
*Assistant Examiner* — Duan Zhang
(74) *Attorney, Agent, or Firm* — The Jansson Firm; Pehr B. Jansson (57) ABSTRACT

A system for authenticating an electronic device by means of an authentication server in order to authenticate a user of said electronic device. The system is adapted to perform an authentication based on a fictive payment transaction and includes the authentication server which is adapted to execute a fictive payment transaction with a predetermined transaction amount with said electronic device and during said execution to receive a first cryptogram from said electronic device; send said first cryptogram to a banking server; and receive from said banking server an acknowledgment if said first cryptogram is valid; when said fictive payment transaction has been executed, compute an authen-
(Continued)

tication identification based on said electronic device's data; said electronic device which is a payment electronic device and which is adapted to execute said fictive payment transaction with said authentication server and during said execution to send said first cryptogram to said authentication server.

13 Claims, 3 Drawing Sheets (51) Int. Cl.
G06Q 20/32 (2012.01)
G06Q 20/38 (2012.01)
H04L 9/40 (2022.01)

(52) U.S. Cl.
CPC ....... *G06Q 20/3229* (2013.01); *G06Q 20/341* (2013.01); *G06Q 20/352* (2013.01); *G06Q 20/353* (2013.01); *G06Q 20/3823* (2013.01); *G06Q 20/40* (2013.01); *H04L 63/0853* (2013.01); *H04L 63/0892* (2013.01); *G06Q 2220/00* (2013.01)

(58) Field of Classification Search
CPC ............. G06Q 20/341; G06Q 20/3229; G06Q 20/3227; G06Q 20/3823; G06Q 2220/00; H04L 63/0892; H04L 63/0853
See application file for complete search history.

(56) References Cited

U.S. PATENT DOCUMENTS

| | | | |
|---|---|---|---|
| 2003/0074560 A1* | 4/2003 | Shimada | G06F 16/955 707/E17.112 |
| 2004/0204775 A1* | 10/2004 | Keyes | G06Q 30/0283 705/400 |
| 2010/0312657 A1 | 12/2010 | Coulter | |
| 2011/0208658 A1* | 8/2011 | Makhotin | G06Q 20/385 235/380 |
| 2012/0018506 A1* | 1/2012 | Hammad | G06Q 20/3674 235/375 |
| 2012/0159598 A1* | 6/2012 | Kim | G06F 21/31 726/7 |
| 2013/0125223 A1* | 5/2013 | Sorotokin | H04L 9/3213 713/168 |
| 2013/0151359 A1* | 6/2013 | Fujisawa | G06Q 20/204 705/17 |
| 2014/0279519 A1* | 9/2014 | Mattes | G06Q 20/12 705/44 |
| 2015/0046340 A1* | 2/2015 | Dimmick | G06Q 20/384 705/72 |

OTHER PUBLICATIONS

PCT/EP2015/072091, Written Opinion of the International Searching Authority, dated Dec. 16, 2915, European Patent Office, P.B. 5818 Patentlaan 2 NL—2280 HV Rijswijk—Pays Bas.

* cited by examiner

SYSTEM FOR AUTHENTICATING AN ELECTRONIC DEVICE BY MEANS OF AN AUTHENTICATION SERVER

TECHNICAL FIELD

The present invention relates to a system for authenticating an electronic device by means of an authentication server.

Such system may be used in a non-limitative example with an electronic device such as a payment card.

BACKGROUND OF THE INVENTION

Today, a lot of service providers require the users of a service they provide to authenticate before accessing said service. For examples said service providers are in the banking domain, but also in a large range of private or public services: taxes, teaching, transports, loyalty . . .

Usually, authenticating a user shall require one or several prerequisites as specific, possibly complex enrolment; dedicated devices, dedicated cards, dedicated tokens, passwords, IDs, dedicated applications etc.

One problem of this prior art is that authentication systems used in that context are usually specific to each service provider and complex.

SUMMARY OF THE INVENTION

It is an object of the invention to provide a system for authenticating an electronic device by means of an authentication server in order to authenticate a user of said electronic device, which permits a simple but strong authentication of said user with his electronic device.

To this end, there is provided a system for authenticating an electronic device by means of an authentication server in order to authenticate a user of said electronic device, wherein said system is adapted to perform an authentication based on a fictive payment transaction and comprises:

said authentication server which is adapted to:
execute a fictive payment transaction with a predetermined transaction amount with said electronic device and during said execution to:
receive a first cryptogram from said electronic device;
send said first cryptogram to a banking server; and
receive from said banking server an acknowledgment if said first cryptogram is valid;
when said fictive payment transaction has been executed, compute an authentication identification based on said electronic device's data;
said electronic device which is a payment electronic device and which is adapted to execute said fictive payment transaction with said authentication server and during said execution to:
send said first cryptogram to said authentication server.

As we will see in further details, by using a payment transaction, the system leverages the strong credentials issued by a bank. And by using a fictive payment transaction, the system additionally permits a live check of validity with the issuing bank, without debiting the user's banking account. As the authentication system is based on a classical payment transaction. It is therefore not anymore specific to a service provider, as it may be available for any service provider and for any user (who holds a payment electronic device).

According to non-limitative embodiments of the invention, the system in accordance with the invention further comprises the following characteristics.

In a non-limitative embodiment, said fictive payment transaction is a fictive EMV payment transaction.

In a non-limitative embodiment, said predetermined transaction amount is equal to zero or to a single currency unit.

In a non-limitative embodiment, said acknowledgement is an intermediate cryptogram.

In a non-limitative embodiment, during the execution of said fictive payment transaction:
said electronic device is further adapted to:
receive said acknowledgement from said authentication server;
upon receiving said acknowledgement, send a second cryptogram to said authentication server; and
said authentication server is further adapted to:
send said acknowledgement to said electronic device;
receive said second cryptogram from said electronic device;
send said second cryptogram to said banking server.

In a non-limitative embodiment, said electronic device is a secure element or comprises a secure element.

In a non-limitative embodiment, said secure element is a smart card, an embedded secure element, a micro-SD, an UICC.

In a non-limitative embodiment, said smart card is a contact smart card or a contactless smart card.

In a non-limitative embodiment, said electronic device is adapted to cooperate within a portable electronic device.

In a non-limitative embodiment, said portable electronic device is a mobile phone, a tablet, a smart phone, a notebook.

In a non-limitative embodiment, said authentication server is further adapted to send to said portable electronic device a short message service, an email, a phone notification, or a direct call.

In a non-limitative embodiment, said electronic device is associated to a user of a service provided by a service provider.

In a non-limitative embodiment, said authentication server is further adapted to send said authentication identification to a service provider's server.

In a non-limitative embodiment, said authentication server is further adapted to receive an authentication request from a service provider's server, said authentication request triggering the execution of said fictive payment transaction.

In addition, there is provided a method for authenticating an electronic device by means of an authentication server in order to authenticate a user of said electronic device, wherein said method comprises:

the execution of a fictive payment transaction with a predetermined transaction amount between said authentication server and said electronic device, said electronic device being a payment electronic device, said execution comprising:
sending by means of said electronic device a first cryptogram to said authentication server;
receiving by means of said authentication server said first cryptogram from said electronic device;
sending by means of said authentication server said first cryptogram to a banking server;
receiving by means of said authentication server from said banking server an acknowledgment if said first cryptogram is valid; and when said fictive payment transaction has been executed, the computation by means of said authentication server of an authentication identification based on said electronic device's data.

In addition, there is provided an authentication server for authenticating an electronic device in order to authenticate a user of said electronic device, wherein said authentication server is adapted to:
execute a fictive payment transaction with a predetermined transaction amount with said electronic device, said electronic device being a payment electronic device, and during said execution to:
receive a first cryptogram from said electronic device;
send said first cryptogram to a banking server;
receive from said banking server an acknowledgement if said first cryptogram is valid; and
when said fictive payment transaction has been executed, compute an authentication identification based on said electronic device's data.

BRIEF DESCRIPTION OF THE FIGURES

Some embodiments of methods and/or apparatus in accordance with embodiments of the present invention are now described, by way of example only, and with reference to the accompanying drawings, in which.

DESCRIPTION OF EMBODIMENTS OF THE INVENTION

In the following description, well-known functions or constructions by the man skilled in the art are not described in detail since they would obscure the invention in unnecessary detail.

The present invention relates to a system SYS for authenticating an electronic device D by means of an authentication server A_SERV in order to authenticate a user U of said electronic device D. Hence, this means that the system SYS is adapted to authenticate a user with his electronic device D.

In the following, the user of said electronic device D is also called the cardholder.

Figure 1:
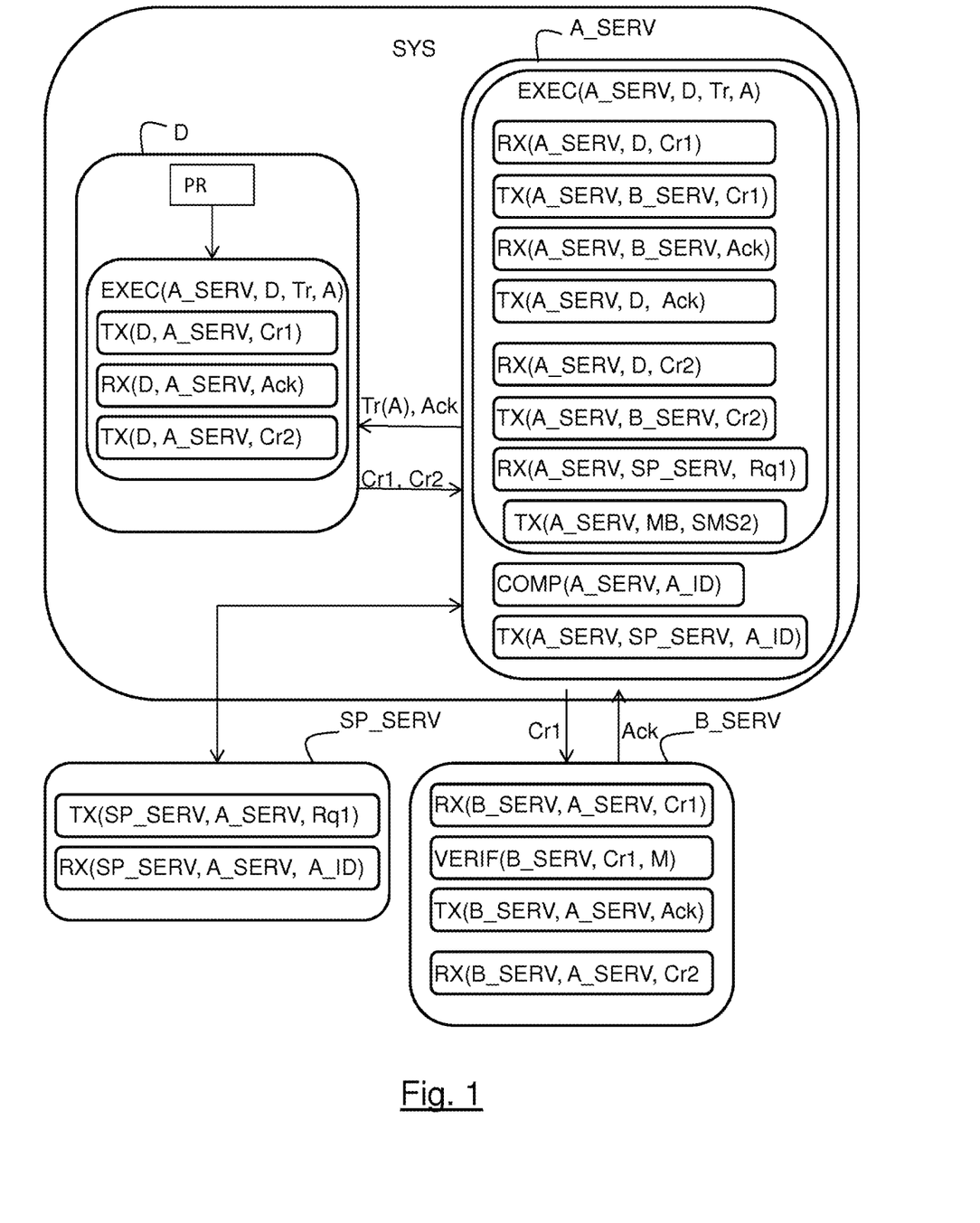
FIG. 1 illustrates schematically a non-limitative embodiment of the system according to the invention, said system comprising an electronic device and an authentication server.

Said system SYS is illustrated in FIG. 1.
The system SYS comprises:
said authentication server A_SERV; and
said electronic device D.

The system SYS is adapted to cooperate with a banking server B_SERV and a service provider's server SP_SERV.

The electronic device D and the authentication server SERV are described hereinafter in details.

For the following, an application App is a set of one or more programs designed to carry out one or a plurality of functions for a specific purpose. A function comprises one or a plurality of operations.

As described hereinafter, said system SYS is adapted to perform an authentication A of said electronic device D by means of said authentication server A_SERV based a fictive payment transaction Tr, said electronic device being a payment electronic device.

Authentication Server SERV

The authentication server SERV is illustrated in FIG. 1.
Said authentication server SERV is a remote server.
It permits to execute a fictive payment transaction Tr with the electronic device D to authenticate said user U. He is in charge of managing the payment transaction with the electronic device D. Hence, said authentication server A_SERV acts as a payment terminal.

Said authentication server A_SERV is adapted to:
execute a fictive payment transaction Tr with a predetermined transaction amount A with said electronic device D (function illustrated in FIG. 1 EXEC(A_SERV, D, Tr, A)) and during said execution to:
receive a first cryptogram Cr1 from said electronic device D (function illustrated in FIG. 1 RX(A_SERV, D, Cr1));
send said first cryptogram Cr1 to a banking server B_SERV (function illustrated in FIG. 1 TX(A_SERV, B_SERV, Cr1)); and
receive from said banking server B_SERV an acknowledgment Ack if said first cryptogram Cr1 is valid (function illustrated in FIG. 1 RX(A_SERV, B_SERV, Ack));
when said fictive payment transaction Tr has been executed, compute an authentication identification A_ID based on said electronic device's data PAN (function illustrated in FIG. 1 COMP(A_SERV, A_ID)).

These functions and other functions of the authentication server A_SERV are described in the following.

It is to be noted that a fictive payment transaction Tr means that there won't be any debit on the banking account associated to the electronic device D of the user, even when the payment transaction Tr is completed.

In a non-limitative embodiment, said fictive payment transaction Tr is an EMV® ("Europay Master Card") payment transaction. It permits to use an EMV process which is well-known as it is a standard. Therefore, the electronic device D is adapted to execute an EMV® payment transaction. It is therefore a standardize EMV® payment card. As many users hold such an EMV® payment card, the service provider SP doesn't need to provide the user with a specific electronic device to authenticate himself to a service provider's server SP_SERV. The user only needs to use his EMV® payment card D. Moreover, it permits to have a strong authentication, as it benefits from EMV® high security level.

The authentication server A_SERV is adapted to cooperate with service provider's servers SP_SERV and with banking servers B_SERV.

In non-limitative embodiment, these banking servers B_SERV are servers of issuing banks, and/or servers of an acquiring bank. An issuing bank is a bank which has issued the electronic device D used by the user U to perform the fictive payment transaction Tr. An acquiring banking server is a server which makes the link between the authentication server A_SERV and the issuing banking's servers. It permits the authentication server A_SERV to communicate with only one server which will relay his communication to the righteous issuing banking's server.

Figure 2:
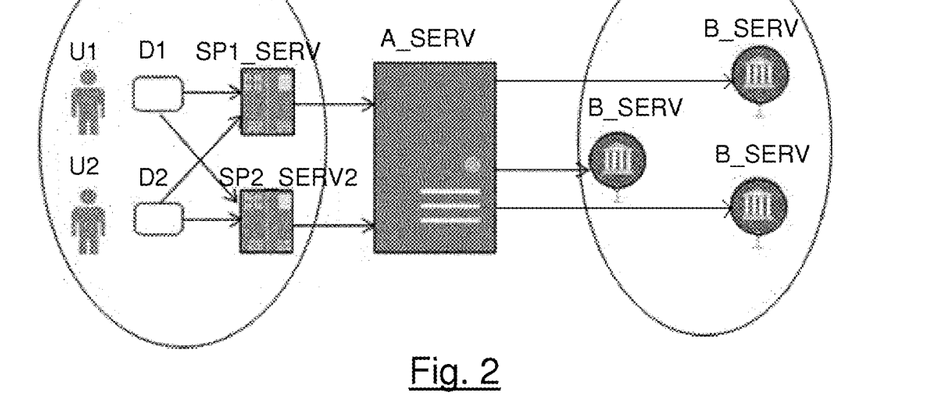
FIG. 2 illustrates schematically a non-limitative embodiment of the electronic device and the authentication server of FIG. 1 which are adapted to cooperate with at least one service provider's server and one banking server.

FIG. 2 illustrate two users U1 and U2 who want to access one or a plurality of services proposed by two service providers SP1 and SP2. For their authentication, they will use their electronic device respectively D1, D2. The service provider server SP1_SERV and SP2_SERV of each service provider SP1, SP2 will request the authentication server A_SERV an authentication of the users U1, U2. For this purpose, the authentication server A_SERV will cooperate with the payment cards U1, U2 and with the banking server B_SERV of the issuing banks which have provided the payments card D1, D2 to the users U1, U2 It is to be noted that the authentication server A_SERV knows the bank which has issued the payment card thanks to the PAN of the payment card.

Hence, in a non-limitative embodiment, said authentication server A_SERV is further adapted to receive an authentication request Rq1 from a service provider's server SP_SERV, said authentication request Rq1 triggering the execution of a fictive payment transaction Tr, and therefore the process of authentication by the authentication server A_SERV (function illustrated in FIG. 1 RX(A_SERV, SP_SERV, Rq1)).

The user U may access to a service S of the service provider via a pc or a portable electronic device MB. In non-limitative embodiments, said portable electronic device is a mobile phone, a tablet, a smart phone, a notebook.

In non-limitative embodiments, the electronic device D may be external to the portable electronic device MB or integrated in said electronic device MB.

In another non-limitative embodiment, the electronic device D is a portable electronic device MB itself. For example, it is the mobile phone MB itself.

In a first non-limitative embodiment, said authentication server A_SERV is further adapted to send a short message service SMS, an email, a phone notification, a QR Code, or a direct call to said portable electronic device MB (function illustrated in FIG. 1 TX(A_SERV, MB, SMS)).

It permits to indicate the user that he needs to authenticate himself to the service provider with his electronic device D. In this case, the user needs to:
  approach his electronic device D near his portable electronic device MB, when the electronic device D is a contactless device;
  insert his electronic device D in a terminal reader connected to his pc, when the electronic device D is a contact device.

When using an SMS, an email, a QR Code or a phone notification, a text with a link is sent to the portable electronic device MB. When using a direct call, a vocal message is used.

In a non-limitative embodiment, the link may also indicate that the user has also to enter some credentials, such as his PIN (Personal Identification Number) code.

When the user approach or insert his electronic device D and furthermore if requested his credentials, the fictive payment transaction is initiated and executed.

This first non-limitative embodiment applies when the electronic device D is external to the portable electronic device MB of the user.

In a second non-limitative embodiment, said authentication server A_SERV is further adapted to display a message on the mobile phone MB indicating the user to confirm his authentication by activating an icon for example. When confirming his authentication, the fictive payment transaction is initiated and executed.

This second non-limitative embodiment applies when the electronic device D is integrated within the portable electronic device MB or is the portable electronic device MB itself.

In a non-limitative embodiment, said authentication server A_SERV is adapted to receive said acknowledgment Ack only if:
  a maximum payment amount M associated to said electronic device D is not reached. It means that the banking server B_SERV has verified the maximum payment amount M granted to the account of the cardholder of the payment card D, and if this maximum payment amount M is exceeded, the banking server B_SERV doesn't send any acknowledgement Ack.
  the date of validity of the payment card D is still valid; and
  the payment card D has not been stolen. It is not listed in a blacklist of the banking server B_SERV.

In a non-limitative embodiment said acknowledgment Ack is an intermediate cryptogram. In this case, said authentication server A_SERV is further adapted to send said intermediate cryptogram Ack to said electronic device D (function illustrated TX(A_SERV, D, Ack)). It permits the electronic device D to verify that the banking server B_SERV is genuine, and if it is the case, to continue the execution of the fictive payment transaction Tr.

When the fictive payment transaction Tr is completed, the authentication server A_SERV is further adapted to receive from the electronic device D a second cryptogram Cr2 (function illustrated RX(A_SERV, D, Cr2)) and to send it to said banking server B_SERV (function illustrated TX(A_SERV, B_SERV, Cr2)). The second cryptogram Cr2 permits to tell the banking server B_SERV that the electronic device D is genuine and that the fictive payment transaction Tr has been well executed.

Hence, the first cryptogram Cr1, the intermediate cryptogram Ack and the second cryptogram Cr2 permit to perform a mutual authentication between the banking server B_SERV and the electronic device D. Both the banking server B_SERV and the electronic device D are assured of the others' identity. The banking server B_SERV is assured that the electronic device D is not a fake card, and the electronic device D is assured that the banking server B_SERV is not a fake one. Moreover, these cryptograms permit the electronic device D and the banking server B_SERV to inform each other of the well execution and acceptation of the fictive payment transaction Tr.

It is to be noted that as the electronic device D will execute the fictive payment transaction Tr (with no debit), the maximum payment amount M is decreased at the banking server side B_SERV from the predetermined transaction amount A of the fictive transaction, and is verified by said banking server B_SERV. If said maximum payment amount M is equal to zero (after the decrease), the fictive payment transaction Tr will not be accepted by the banking server B_SERV. This latter won't send any acknowledgement Ack to the authentication server A_SERV and will block the user's banking account.

Therefore, the predetermined transaction amount A should be low to avoid discarding the fictive payment transaction Tr for nothing, as the aim is not to block the user's banking account, but to perform a successful fictive payment transaction Tr for an authentication of the user U.

To this end, in a non-limitative embodiment said predetermined transaction amount A is equal to zero or to a single currency unit. In non-limitative examples, a single currency unit is one cent in dollars or in Euros.

In a non-limitative embodiment, the computation of the authentication identification A_ID is performed using an AES (Advance Encryption Standard) encryption. The computation may be performed based on the whole primary account number PAN of the electronic device D, a truncated version of the PAN, of a cryptographic derivation of the PAN. It guarantees that the authentication identification A_ID is valid and unique without disclosing user's confidential data.

In a non-limitative embodiment, the authentication server A_SERV is further adapted to send said authentication identification A_ID to the service provider's server SP_SERV (function illustrated in FIG. 1 TX(A_SERV, SP, A_ID)).

Hence, this authentication identification A_ID will be associated by the service provider to the user U. It may be used as an enrollment means for the user towards said service provider SP. Hence, the service provider SP will store in a database the username and said authentication A_ID for example.

Hence, said user will be able to create a local account thanks to an authentication required for a payment, without providing specific or new strong authentication means usually asked by the service provider SP, such as in non-limitative examples a specific password, ID, a biometric authentication, using a dedicated card, a dedicated token, a dedicated application etc.

Electronic Device D

The electronic device D is illustrated in FIG. 1. It is a payment electronic device.

In a first non-limitative embodiment, the electronic device D is a secure element or comprises a secure element. In non-limitative variants, said secure element is a smart card, an UICC (Universal Integrated Circuit Card), an embedded secure element, a micro-SD. The smart card may be contact or contactless.

In a second non-limitative embodiment, the electronic device D may be an HCE (host card emulator).

In a non-limitative embodiment, the electronic device D is a connected object. Said connected object may comprise a secure element or not.

In a first non-limitative embodiment, said electronic device D is adapted to cooperate with a portable electronic device MB, which is in non-limitative examples a mobile phone MB, a tablet, a smart phone, a notebook etc.

In a first non-limitative variant, said electronic device D is comprised within a portable electronic device MB. In this case, the electronic device is an UICC, an embedded secure element, a micro-SD, or an HCE in non-limitative examples.

In a second non-limitative variant, said electronic device D is independent from said portable electronic device MB. In this case, the electronic device is a contactless smart card in a non-limitative example.

In these first and second variants, the portable electronic device MB will be used as a reader terminal as it will read the electronic device's data and send them to the authentication server A_SERV.

In a second non-limitative embodiment, the electronic device D, is the portable electronic device MB itself. In this case, the portable electronic device MB comprises the payment application App.

As described before, said electronic device D is associated to a user U of a service S provided by a service provider SP.

The electronic device D is adapted to execute a payment transaction. It comprises the payment application App which permits to execute some payment transactions and therefore the fictive payment transaction Tr.

As will be described in the following, when a user U wants to access to a service S of a service provider SP, said service provider SP will ask him (via the authentication server A_SERV) to authenticate himself with his electronic device D.

The functions of the electronic device D described in the following are processed by the electronic device D by means of a unit processor PR in a non-limitative embodiment. More particularly, these functions are carried out by a payment application App. The payment application App is an EMV® application in a non-limitative example.

It is to be noted that a unit processor PR comprises one or a plurality of processors.

The electronic device D is adapted to execute said fictive payment transaction Tr with said authentication server A_SERV (function illustrated in FIG. 1 EXEC(A_SERV, D, Tr, A)), and during said execution to:
send said first cryptogram Cr1 to said authentication server A_SERV (function illustrated in FIG. 1 TX(D, A_SERV, Cr1)).

In a non-limitative embodiment, the electronic device D is further adapted to:
receive said acknowledgement Ack from said authentication server A_SERV (function illustrated in FIG. 1 RX(D, A_SERV, Ack)); and
upon receiving said acknowledgement Ack, send a second cryptogram Cr2 to said authentication server A_SERV (function illustrated in FIG. 1 TX(D, A_SERV, Cr2)).

It is to be noted that the execution of the fictive payment transaction Tr may comprise sensitive data. Therefore, in a non limitative embodiment, for said execution, a secure channel communication Sch is established between the authentication server A_SERV and said electronic device D via an Hyper Text Transfer Protocol HTTP using a Transport Layer Security Handshake TLS, or via shared secrets, or via a combination of both.

Figure 3:
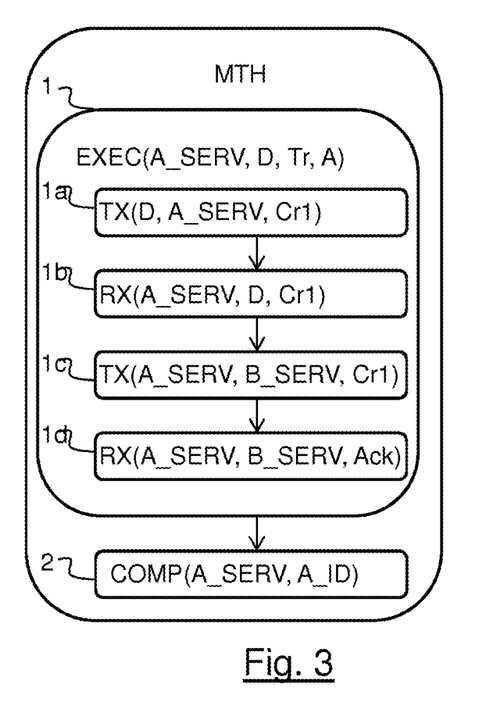
FIG. 3 is a schematic organization chart of a method carried out by the system of FIG. 1 according to a non-limitative embodiment.

Hence, the system SYS is adapted to carry out a method MTH illustrated in FIG. 3 for authenticating said electronic device D by means of said authentication server A_SERV in order to authenticate a user U of said electronic device D, wherein said method MTH comprises 1) the execution of a fictive payment transaction Tr with a predetermined transaction amount A between said authentication server A_SERV and said electronic device D (step illustrated EXEC(A_SERV, D, Tr, A)), said execution comprising:
1a) sending by means of said electronic device D a first cryptogram Cr1 to said authentication server A_SERV (step illustrated TX(D, A_SERV, Cr1));
1b) receiving by means of said authentication server A_SERV said first cryptogram Cr1 from said electronic device D (step illustrated RX(A_SERV, D, Cr1));
1c) sending by means of said authentication server A_SERV said first cryptogram Cr1 to a banking server B_SERV (step illustrated TX(A_SERV, B_SERV, Cr1)); and
1d) receiving by means of said authentication server A_SERV from said banking server B_SERV an acknowledgment Ack if said first cryptogram Cr1 is valid (step illustrated RX(A_SERV, B_SERV, Ack));
2) when said fictive payment transaction Tr has been executed, the computation by means of said authentication server A_SERV of an authentication identification A_ID based on said electronic device's data PAN.

Figure 4:
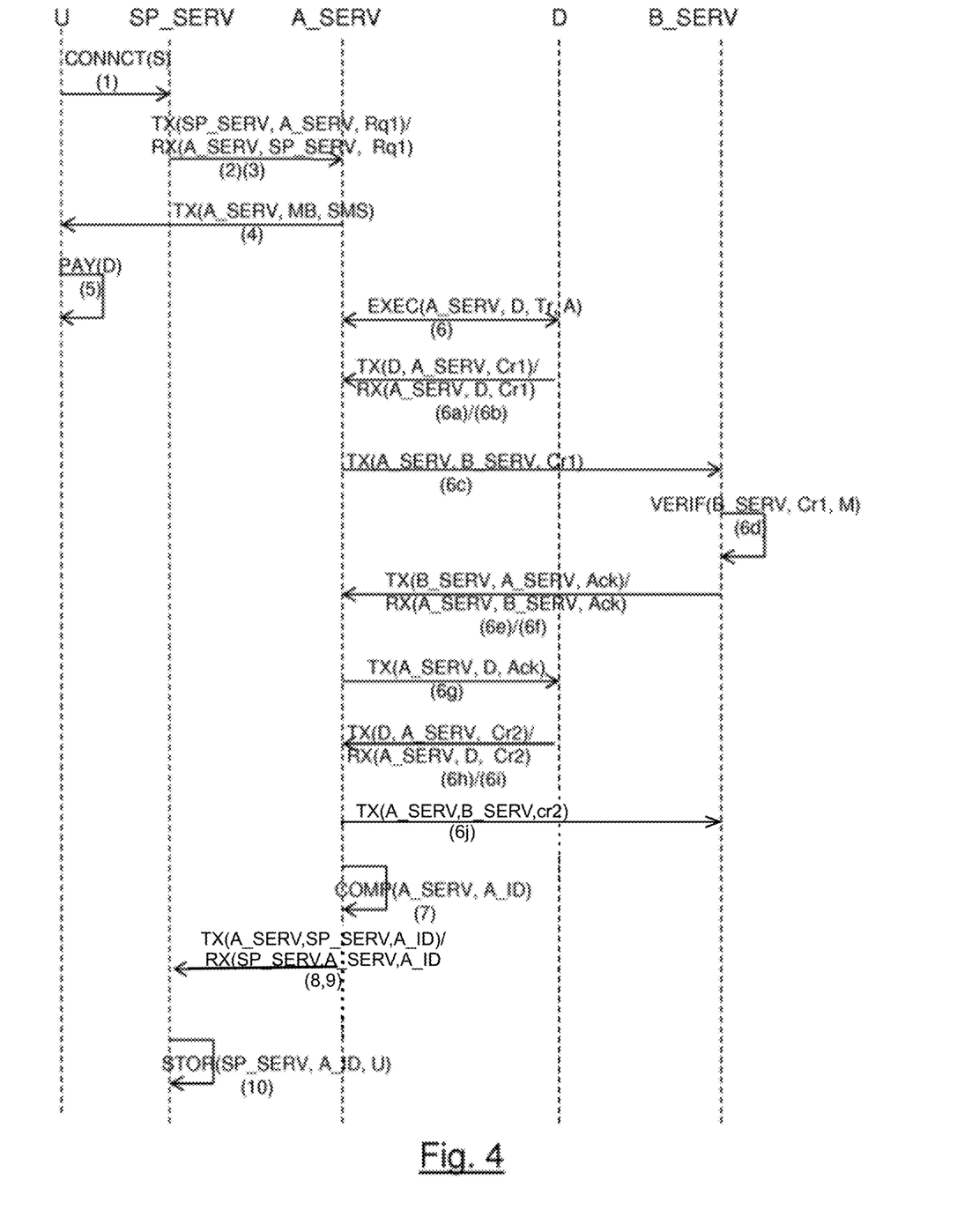
FIG. 4 is diagram of a use-case using the method of FIG. 1 according to a non-limitative embodiment.

FIG. 4 a diagram illustrating the steps of a method MTH for authenticating said electronic device D by means of said authentication server A_SERV. It also illustrates the cooperation between the system SYS, the user U, the banking server B_SERV and the service provider's server SP_SERV.

In the non-limitative example illustrated:
the user accesses to a service S via a portable electronic device MB which is his mobile phone;

the authentication server A_SERV uses the user's mobile phone MB to communicate with the user;

the electronic device D is a contactless smart card and therefore is external to the mobile phone MB;

the EMV® process is used;

the predetermined transaction amount A is of one euro;

the fictive payment transaction is online.

For the following, the electronic device D is called payment card D.

It is to be noted that the EMV® process usually comprises the following sub-functions (that will be described in the following).

a) application selection
b) data reading
c) card authentication
d) processing restriction
e) card holder verification
f) risk management
g) first cryptogram
h) online processing
i) first script processing
j) second cryptogram
k) second script cryptogram
l) final decision
m) data capture.

It is to be noted that as the payment transaction Tr is fictive, there won't be any debit of one euro on the user's banking account. As there is no debit of the user's banking account, the step which permits such a debit is not performed. This step is a data payment transaction capture which is called in the EMV protocol, EMV data capture (step m).

In step 1) illustrated CONNCT(S)), when the user U of the payment card D wants to access a service S of a service provider SP, he connects himself to internet via in the non-limitative given example his mobile phone MB in order to connect to a service provider's server SP_SERV.

In step 2), the service provider's server SP_SERV sends a request Rq1 for an authentication of said user U to the authentication server A_SERV.

In a non-limitative embodiment, this authentication request Rq1 may use open identity standards like Open ID Connect, SAML (Security Assertion Markup Language), WS (Web Service)-Federation Identity or may be implemented using proprietary protocol.

In another non-limitative embodiment, the service provider's server SP_SERV may request an authentication of said user U to an intermediate server (not illustrated) which knows all the authentication means of the user.

In non-limitative examples, the authentication means are his payment card D as described, a 3D secure process, a biometric parameter etc.

Said intermediate server will propose the different authentication means to the service provider's server SP_SERV which in turn will choose the authentication means it wants, here the payment card D for a fictive payment transaction Tr. Said intermediate authentication server will relay the authentication request Rq1 to said authentication server A_SERV. Using an intermediate server avoids the service provider server SP_SERV to support as many communication protocols as there are different servers for the different authentication means.

In step 3), said authentication server A_SERV receives said request Rq1.

In step 4), said authentication server A_SERV sends an SMS to the user's mobile phone MB indicating the user to authenticate himself with his payment card D.

In step 5) illustrated PAY(D), the user U puts his payment card D near the mobile phone MB.

In step 6), the authentication server A_SERV executes the fictive payment transaction Tr of one euro with the payment card D.

The execution comprises the transmission by the authentication server A_SERV to the payment card D of the parameters of the fictive payment transaction Tr.

In non-limitative examples, the transmitted parameters are:

"Terminal Country Code"
"Cardholder Verification Method (CVM) Results"
"Terminal Floor Limit"
"Terminal Identification"
"Amount, Authorized (Numeric)"
"Amount, Reference Currency"
"Transaction Certificate Hash Value"
"Transaction Currency Code"
"Transaction Date"
"Transaction Time Stamp"
etc.

As these parameters and the others are described in the EMV 4.3 book (2011), there are not further detailed here.

The execution comprises exchanges of APDUs (Application Protocol Data Unit) between the payment card D and the authentication server A_SERV. Said authentication server A_SERV will relay the necessary exchanged data with the payment card D, to the banking server B_SERV, in particular the first and second cryptograms Cr1 and Cr2.

The execution of the fictive payment transaction Tr comprises the sub-steps a) to l) above-described which are described hereinafter.

For sake of clarity and simplification, all the sub-functions are not illustrated in FIG. 4.

a) Application Selection

The payment card D may comprise a plurality of payment applications, in a non-limitative example, a payment application for EMV, a payment application for VISA, a payment application with credit etc.

The authentication server A_SERV selects the right application to use. In the non-limitative illustrated example, the EMV application is selected.

It is to be noted that this sub-function is optional if the payment card D comprises a unique payment application. It is to be noted that in the EMV protocol, this sub-function is performed.

b) Data Reading

The authentication server A_SERV reads the data of the payment card D. In non-limitative examples, the data read are:

a certificate;
the PAN;
the maximum authorized payment amount;
the currency;
the authorization for foreign payments etc.

c) Card Authentication

The authentication server A_SERV sends the payment card's certificate to the banking server B_SERV. It permits the banking server B_SERV to verify if the payment card is not a fake one. It is a static verification as it doesn't depend on the payment transaction itself.

d) Processing Restriction

The banking server B_SERV verifies the restrictions associated with the payment card D such as in non-limitative examples:

the date of validity;

if the payment card D may be used for payments in such and such currency etc (for example, the user U wants to access to a service S which needs a payment in Euros, or in dollars);

if the payment card D is not present in a black list;

if the payment card D has not been stolen or lost;

if the payment card D is eligible for that kind of payment etc.

e) Card Holder Verification

This sub-function is optional. It is performed if the service provider SP has also requested some credentials verification, such as a PIN code, in addition to the fictive payment transaction Tr. The authentication server A_SERV relays the credentials entered by the user U to the banking server B_SERV which performs the checking.

f) Risk Management

The payment card D answers to the authentication server A_SERV if the payment transaction Tr may be performed with the predetermined amount transaction A regarding the maximum authorized payment amount.

Hence, the payment card D verifies that the maximum authorized payment amount minus the predetermined amount transaction A is different from zero.

g) First Cryptogram

This sub-step is illustrated in FIG. 4.

In step 6a), said payment card D sends a first EMV cryptogram Cr1 to said authentication server A_SERV, which receives it in step 6b) and which sends it in turn to said banking server B_SERV in step 6c).

In a non-limitative example, an EMV cryptogram comprises eight hexadecimal characters.

In a non-imitative embodiment, an EMV cryptogram is computed according to the EMV 4.3 book 2, § 8.1 edited by EMVCo and completed by the VISA® card specifications v1.4-Appendix E (Version 10, 12, or 14), or by the MASTERCARD® PAYPASS Specifications 1.3.1-section 2.5.1 version 11.

h) Online Processing.

This sub-step is illustrated in FIG. 4.

When the payment is online, the first cryptogram Cr1 is verified in real time by the banking server B_SERV. Hence, in step 6d) (illustrated VERIF(B_SERV, Cr1, M), said banking server B_SERV verifies said first EMV cryptogram Cr1 and validate or not said first EMV cryptogram Cr1. If the first EMV cryptogram Cr1 is valid (it has been validated by the banking server B_SERV), it means that the cardholder U is legitimate. It also verifies the maximum payment amount M, the date of validity of the payment card D, if it belongs to a black list etc.

If the first cryptogram Cr1 is valid, in step 6e), said banking server B_SERV sends back an intermediate EMV cryptogram Ack to said authentication server A_SERV which receives it in step 6f) and which relays it to the payment card D in step 6g). It permits the banking server B_SERV to inform the payment card D that it has validated the fictive payment transaction Tr.

In a non-limitative embodiment, the sub-function i)-first script processing (not illustrated) may also be performed. This sub-function is optional. It permits the banking server B_SERV to update some data in the payment card D, such as:

update of the maximum payment amount;

update of the payment application App in the payment card D (in non-limitative example to fix some bugs).

i) Second Cryptogram

In step 6h), the payment card D sends a second cryptogram Cr2 to the authentication server A_SERV which receives it in step 6i) and relays it to the banking server B_SERV in step 6j). Thus, the banking server B_SERV knows that the fictive payment transaction Tr has been well executed.

In a non-limitative embodiment, the sub-function k)-second script cryptogram (not illustrated) may also be performed. This sub-function is optional. It permits the banking server B_SERV to update some data in the payment card D, after the current fictive payment transaction Tr has been executed, such as:

update of the maximum payment amount;

update of the payment application App in the payment card D (in non-limitative example to fix some bugs).

In a non-limitative embodiment, the sub-function i)-final decision (not illustrated) is performed. This sub-function may not be performed when using another payment protocol than the EMV protocol. Therefore, it is a sub-function which is optional. In this sub-function, the payment card D acknowledges the fictive payment transaction Tr, that is to say, after receiving the acknowledgement Ack of the banking server B_SERV (which indicates that said banking server B_SERV agrees to the fictive payment transaction Tr), said payment card D gives its agreement for the payment transaction to be validated. Hence, the final decision to validate the payment transaction Tr lies to the payment card D.

It is to be reminded that the sub-function m)-data capture is not performed. Usually for this sub-function m), the authentication server A_SERV collects all the data of the payment transaction and sends them to the service provider's server SP_SERV and to the banking server B_SERV so that the banking server B_SERV debits the user's account with the predetermined transaction amount A.

Hence, during the execution of the fictive payment transaction Tr, there is no debit of the user's banking account even if the maximum payment amount is not decrease from the predetermined transaction amount A.

In step 7), the authentication server A_SERV computes an authentication identification A_ID based on the PAN's payment card D, and in step 8) sends it to the service provider's server SP_SERV which receives it in step 9).

The service provider's server records said authentication identification A_ID with the username of the cardholder U in step 10) illustrated STOR(SP_SERV, A_ID, U), said step being an enrollment of the user U.

When the whole process of the fictive EMV payment transaction Tr has been well executed, the authentication server A_SERV sends a message to the user, via an SMS on the mobile phone MB in a non-limitative example, to tell him that the authentication is a success.

As he has been authenticated with his payment card D, the user U may now use the service S of the service provider SP.

Next time the user U wants to access to a service S of said service provider SP, the service provider's server SP_SERV will request his username and again an authentication with his payment card D. The authentication server A_SERV will send an authentication identification A_ID' which is the result of the authentication of the payment card D as above-described.

Then the service provider's server SP_SERV will compare this received A_ID' to his own database of authentication identifications A_ID, and check in his database if there is a matching pair of username-authentication identification A_ID.

If it has found a match in his database with the username entered by the user U and the A_ID' received, the service provider's server SP_SERV will grant access to his service S to the user U.

It is to be understood that the present invention is not limited to the aforementioned embodiments and variations and modifications may be made without departing from the scope of the invention.

In a non-limitative embodiment, the authentication identification A_ID may be the PAN itself.

In a non-limitative embodiment, this authentication identification A_ID may be furthermore associated to the electronic device D itself. It means that the service provider server SP_SERV will store some information of said electronic device D. In this case the security level of said service provider server SP_SERV is to be enhanced.

Hence, some embodiments of the invention may comprise one or a plurality of the following advantages:
- it doesn't need specific functions or parameters to be implemented into the user's electronic device D;
- it doesn't need specific enrollment process to be performed by the user;
- it permits the user to benefit from a unique authentication system for several service providers;
- if there are links between different service providers, it permits the user to benefit from a unique authentication system for several service providers, without user's information to be shared between them, or between them and specific authentication service providers. Contrary to other unique authentication system for several services providers, it doesn't imply:
- more complexity; and/or
- the existence of a third party active authenticator; and formal agreement from the user for his information to be shared;
- it permits an authentication of the user with his electronic device D simply using a standard authentication required for a payment transaction;
- it permits a strong authentication as:
- when using the electronic device D and the PIN code for example, it uses a 2-factor authentication;
- it benefits from EMV high security level;
- the identity is vetted by an issuing bank;
- it permits a simple authentication user experience as:
- it uses a "payment-like" operation for a main authentication;
- it allows a simple enrollment process on top of the service provider's intrinsic enrollment;
- it permits to solve the largest hurdle to hardware authentication: device & reader deployment as:
- it re-uses already deployed secure hardware (contactless credit cards or embedded SEs for example);
- it re-uses users' mobiles as main readers;
- it permits easy integration as:
- there is no need for specific devices or software, as far as the user is eligible to a secure remote payment via a contact or contactless card, an UICC, or any other payment application vector;
- it re-uses existing payment infrastructure for authentication (here EMV in the non-limitative given example): there is no need to deploy specific cryptographic server on the service provider's side.

The invention claimed is:

1. A system for authenticating a user of a communication device to a service provider's server by means of authenticating an electronic device of the user to an authentication server, wherein said system is adapted to perform an authentication based on a fictive payment transaction validated by a banking server, the system comprises:
said communication device which is adapted to connect to said service provider's server to allow the user to attempt to access a service of the service provider provided by said service provider's server;
said authentication server which is adapted to:
receive an authentication request from the service provider to authenticate the user attempting access to the service of the service provider;
on an initial authentication attempt by the user using the communication device, transmitting an authentication prompt to the communication device instructing the user to authenticate to the service provider using said electronic device by connecting the electronic device to the communication device and, in response to the user connecting the electronic device to the communication device, execute a fictive payment transaction with a predetermined transaction amount with said electronic device and during said execution:
receive a first cryptogram from said electronic device;
send said first cryptogram to a banking server; and
receive from said banking server an acknowledgment if said first cryptogram is valid and the electronic device is valid and has not been blacklisted;
when said fictive payment transaction has been executed and confirmed as valid by said acknowledgment received from the banking server:
cryptographically compute an authentication identification based on unique data of the electronic device such that the authentication identification uniquely identifies the user;
send said authentication identification to the service provider's server; and
upon a subsequent attempt to authenticate said user to said service provider using said electronic device, transmitting said authentication identification to the service provider's server;
said electronic device, which is a payment electronic device and which is adapted to execute said fictive payment transaction with said banking server via said authentication server, and during said execution of the fictive payment transaction to:
send said first cryptogram to said authentication server;
said service provider's server, which is adapted to:
receive a connection attempt by the user from the communication device;
upon receipt of a connection attempt by the user from the communication device, transmit an authentication request for authentication of the user to the authentication server;
receive said cryptographically computed authentication identification and, in an initial authentication attempt to said service provider, in response to receiving said authentication identification, enroll the user in an account of the service provider by the service provider's server being adapted to record said authentication identification together with a username of the user and allowing the user access to the service of the service provider using the communication device based on receipt of an authentication identification attempt matching the recorded authentication identification; and in a subsequent authentication attempt to said service provider, compare a received authentication identification attempt against said recorded authentication identification in response to the received authentication identification attempt and the recorded authentication identification matching, retrieving the username of the user and allowing the user access to the service of the service provider using the communication device by retrieving the username of the user based on the received authentication identification.

2. The system according to claim 1, wherein said fictive payment transaction is a fictive EMV payment transaction.

3. The system according to claim 1, wherein said predetermined transaction amount is equal to zero or to a single currency unit.

4. The system according to claim 1, wherein during the execution of said fictive payment transaction:
said electronic device is further adapted to:
receive said acknowledgement from said authentication server;
upon receiving said acknowledgement, send a second cryptogram to said authentication server; and
said authentication server is further adapted to:
send said acknowledgement to said electronic device;
receive said second cryptogram from said electronic device;
send said second cryptogram to said banking server.

5. The system according to claim 1, wherein said electronic device is a secure element or comprises a secure element.

6. The system according to claim 5, wherein said secure element is a smart card, an embedded secure element, a micro-SD, or an UICC.

7. The system according to claim 6, wherein said smart card is a contact smart card or a contactless smart card.

8. The system according to claim 1, wherein said electronic device is adapted to cooperate with a portable electronic device.

9. The system according to claim 8, wherein said authentication server is further adapted to send to said portable electronic device a short message service, an email, a phone notification, or a direct call.

10. The system according to claim 1, wherein said portable electronic device is a mobile phone, a tablet, a smart phone, or a notebook.

11. The system according to claim 1, wherein said electronic device is associated to a user of a service provided by a service provider.

12. The system according to claim 1, wherein said authentication server is further adapted to receive an authentication request from a service provider's server, said authentication request triggering the execution of said fictive payment transaction.

13. A method for authenticating a user to a service provider's server by means of an authentication server and an electronic device of the user in order to authenticate the user of said electronic device when attempting to access via a communications device to a service provided on the service provider's server, wherein said method comprises:
receiving, by the service provider's server, an access request from the communications device requesting access for the user to the service provided by the service provider's server, and in response thereto, transmitting an authentication request from the service provider's server to the authentication server to authenticate the user attempting access to the service of the service provider;
receiving, by the authentication server, the authentication request to authenticate the user from the service provider's server;
transmitting, by the authentication server to the communication device, an authentication prompt instructing the user to authenticate the user to the service provider using the electronic device by connecting the electronic device to the communication device;
in response to the user connecting the electronic device to the communication device, executing, on an initial attempt to authenticate the user to the service provider using said electronic device, of a fictive payment transaction with a predetermined transaction amount between said banking server and said electronic device via said authentication server, said electronic device being a payment electronic device, said execution comprising:
sending by means of said electronic device a first cryptogram to said authentication server;
receiving by means of said authentication server said first cryptogram from said electronic device;
sending by means of said authentication server said first cryptogram to a banking server;
receiving by means of said authentication server from said banking server an acknowledgment if said first cryptogram is valid and the electronic device is valid and has not been blacklisted; and
when said fictive payment transaction has been executed and confirmed as valid by said acknowledgement received from the banking server, the cryptographic computation by means of said authentication server of an authentication identification based on unique data of the electronic device such that the authentication identification uniquely identifies the user;
sending said authentication identification to the service provider's server;
receiving said authentication identification by the service provider's server, in response to receiving said authentication identification, enrolling the user in an account of the service provider by the service provider's server by recording said authentication identification together with a username of the user and allowing the user access to the service of the service provider using the communication device based on receipt of an authentication identification attempt matching the recorded authentication identification;
in a subsequent attempt to authenticate to said service provider:
sending an authentication identification attempt to the service provider's server; and
comparing, by the service provider's server, the received authentication identification attempt against said recorded authentication identification in response to the received authentication identification attempt and the recorded authentication identification matching, retrieving the username of the user and allowing the user access to the service of the service provider using the communication device.

* * * * *